US012100299B2

(12) United States Patent
Forscher et al.

(10) Patent No.: US 12,100,299 B2
(45) Date of Patent: Sep. 24, 2024

(54) PREDICTIVE THREAT WARNING SYSTEM

(71) Applicant: GM Cruise Holdings LLC, San Francisco, CA (US)

(72) Inventors: Edward Forscher, Oakland, CA (US); Curt Harrington, Cherry Hill, NJ (US); William Anthony Silva, San Rafael, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 158 days.

(21) Appl. No.: 17/892,652

(22) Filed: Aug. 22, 2022

(65) Prior Publication Data

US 2024/0062656 A1 Feb. 22, 2024

(51) Int. Cl.
*G08G 1/16* (2006.01)
*B60W 60/00* (2020.01)
*H04W 4/46* (2018.01)

(52) U.S. Cl.
CPC ............ *G08G 1/163* (2013.01); *G08G 1/166* (2013.01); *B60W 60/0015* (2020.02); *B60W 2554/4041* (2020.02); *B60W 2554/4042* (2020.02); *B60W 2554/4044* (2020.02); *B60W 2554/4049* (2020.02); *B60W 2556/65* (2020.02); *H04W 4/46* (2018.02)

(58) Field of Classification Search
CPC ......... G08G 1/163; G08G 1/166; H04W 4/46; B60W 2554/4041; B60W 60/0015; B60W 2554/4042; B60W 2554/4044; B60W 2556/65; B60W 2554/4049; B60W 30/0956; B60W 50/14
See application file for complete search history.

(56) References Cited

U.S. PATENT DOCUMENTS

| | | | |
|---|---|---|---|
| 2018/0304810 A1 | 10/2018 | Brubaker | |
| 2020/0148201 A1* | 5/2020 | King | G06N 20/00 |
| 2021/0139023 A1* | 5/2021 | Crego | B60W 30/0956 |
| 2021/0139024 A1* | 5/2021 | Crego | B60W 30/0953 |
| 2021/0339741 A1* | 11/2021 | Rezvan Behbahani | |
| | | | B60W 40/04 |
| 2021/0370921 A1* | 12/2021 | Silva | B60W 60/0027 |
| 2022/0194368 A1* | 6/2022 | Nemoto | H04W 4/46 |

OTHER PUBLICATIONS

Kim, Seong-Woo, et al, "Cooperative Autonomous Driving using Cooperative Perception and Mirror Neuron Inspired Intention Awareness", 2014 International Conference on Connected Vehicles and Expo (ICCVE), 2014, 8 pages.
"Support for Self-Driving Vehicles Las Vegas Case Study", Commsignia. (https://www.commsignia.com/casestudy/las-vegas/).

* cited by examiner

*Primary Examiner* — Sisay Yacob

(57) ABSTRACT

Systems and techniques are provided for vehicle safety technologies. An example method can include determining, based on sensor data captured by an autonomous vehicle, a first position of a different vehicle and a second position of one or more objects; determining, based on the first position of the different vehicle and the second position of the one or more objects, a risk of a collision between the different vehicle and the one or more objects; and based on a determination that the risk of the collision exceeds a threshold, outputting an alert representing a warning of the collision between the different vehicle and the one or more objects, the alert being directed to at least one of the different vehicle and the one or more objects.

15 Claims, 7 Drawing Sheets

PREDICTIVE THREAT WARNING SYSTEM

TECHNICAL FIELD

The present disclosure generally relates to threat detection and warning systems for autonomous vehicles. For example, aspects of the present disclosure relate to techniques and systems for situational, predictive multiple threat warning systems for autonomous vehicles.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at specific locations on the autonomous vehicles.

BRIEF DESCRIPTION OF THE DRAWINGS

Illustrative aspects and examples of the present application are described in detail below with reference to the following figures.

DETAILED DESCRIPTION

Figure 1:
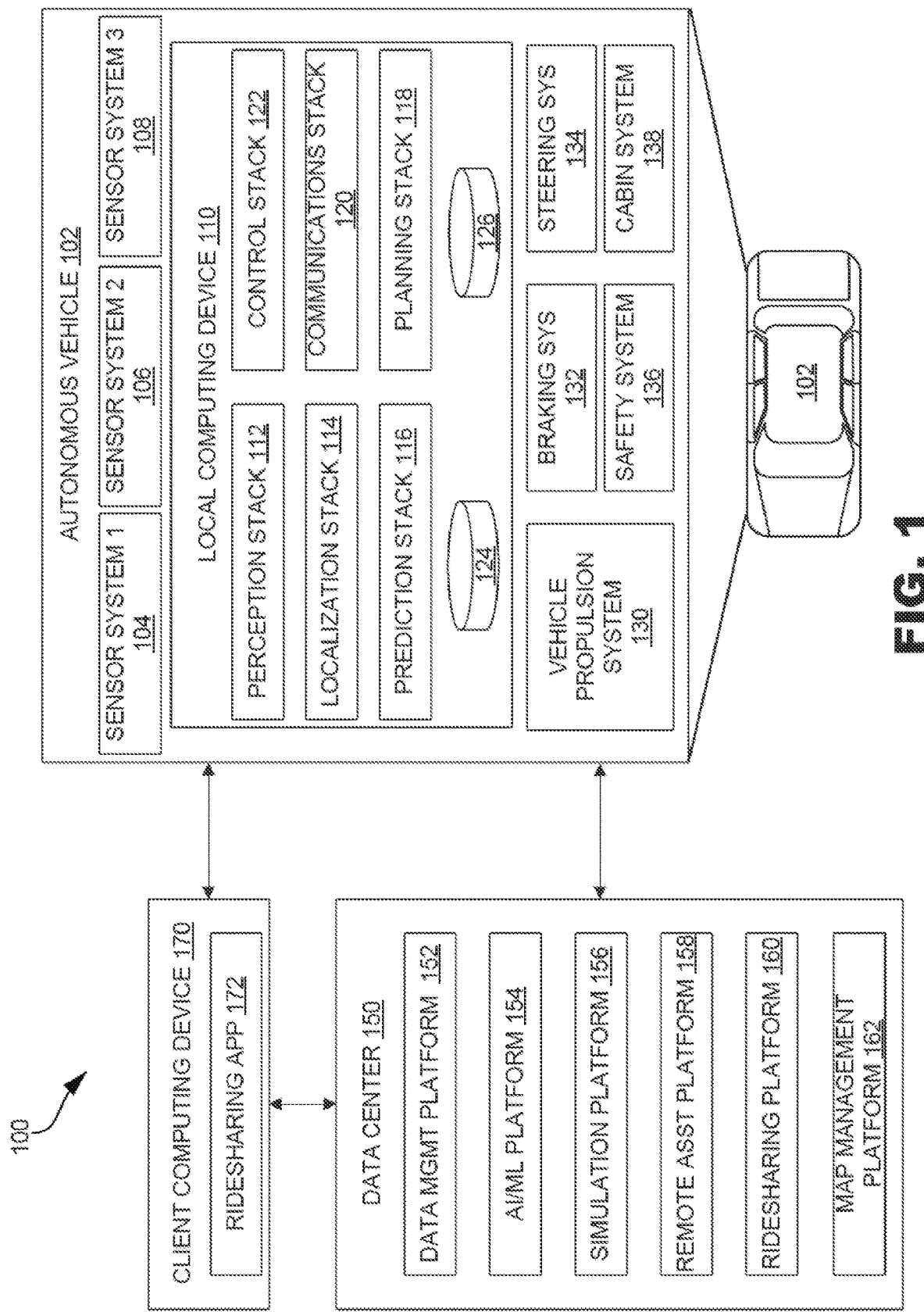
FIG. 1 is a diagram illustrating an example system environment that can be used to facilitate autonomous vehicle navigation and routing operations, in accordance with some examples of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the application. However, it will be apparent that various aspects and examples of the disclosure may be practiced without these specific details. The figures and description are not intended to be restrictive.

The ensuing description provides examples and is not intended to limit the scope, applicability, or configuration of the disclosure. Rather, the ensuing description of aspects and examples of the disclosure will provide those skilled in the art with an enabling description for implementing an example implementation of the disclosure. It should be understood that various changes may be made in the function and arrangement of elements without departing from the scope of the application as set forth in the appended claims.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, a light detection and ranging (LIDAR) sensor, a radio detection and ranging (RADAR) sensor, amongst others, which the AVs can use to collect data and measurements that the AVs can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

Collisions involving at least one vehicle represent a meaningful threat to road users and can be caused by a variety of reasons such as, for example, human error, road conditions, weather conditions, events, etc. Even seasoned and/or defensive drivers can experience vehicle collisions and/or associated risks. Numerous vehicle safety technologies can be implemented by autonomous vehicles and other vehicles to mitigate the risks and/or occurrences of collisions involving at least one vehicle. For example, a vehicle may implement a number of different sensors to detect objects and conditions in a driving environment and trigger actions (e.g., vehicle maneuvers, etc.) to avoid collisions, mitigate the risk of collisions, and/or mitigate the harm of collisions. While vehicle safety technologies can mitigate the risk that a vehicle may be involved in a collision, there are numerous potential risks from third parties (e.g., other vehicles, pedestrians, motorcyclists, etc.), animals, objects/obstacles, and/or occlusions that are difficult to avoid and/or mitigate.

Described herein are systems, apparatuses, processes (also referred to as methods), and computer-readable media (collectively referred to as "systems and techniques") for vehicle safety technologies. In some aspects, the systems and techniques described herein can provide a situational, predictive threat warning system for vehicles and road users. For example, in some cases, an autonomous vehicle (or another vehicle with sensors) can use sensors to detect threats/risks to other vehicles, road users, pedestrians, etc., and generate alerts to warn the other vehicles, road users, pedestrians, etc., of the detected threats/risks.

To illustrate, a first vehicle that is in front of a second vehicle may determine that, given the trajectory of the second vehicle and the trajectory of another road user (e.g., a pedestrian, another vehicle, a motorcyclist, etc.) as determined based on sensor data collected by the first vehicle, the second vehicle and the other road user have a high or threshold probability of colliding if they continue their respective trajectories. To prevent a collision between the second vehicle and the other road user, the first vehicle may output one or more alerts warning the second vehicle and/or the other road user of the collision risk and/or indicating potential actions that may be taken to avoid such a collision. The one or more alerts can include, for example and without limitation, an audio alert (e.g., an audio output from a speaker(s) on the first vehicle indicating the collision risk and/or providing instructions for avoiding such a collision), a visual alert (e.g., a light or pattern of light emitted from a lighting system of the first vehicle such as a tail light, a blinker, a fog light, a headlight, a cabin light, a visual projection from a projector system on the first vehicle, a video and/or image displayed by a display device on the first vehicle, etc.), a vehicle-to-vehicle (V2V) communication signal (e.g., an alert signal, a signaled instruction, a signaled parameter(s) for a vehicle planning stack, etc.), a vehicle-to-everything (V2X) communication signal, etc. Such alerts may not only warn others of potential collision risks/threats but may also allow others to take actions/countermeasures to prevent or mitigate the risk/threat.

As another illustrative example, if an autonomous vehicle encounters a multiple threat situation in which the autonomous vehicle is the leading vehicle (or causing a vehicle behind it to be occluded from another road user or pedestrian) the autonomous vehicle can proactively provide information (e.g., in the form of visual signals, audio signals, V2X communications, and/or V2V communications) to warn the trailing vehicle of a road user that is occluded from and/or outside of a field-of-view (FOV) of the trailing vehicle (e.g., outside of the FOV of one or more sensor systems of the trailing vehicle and/or a driver of the trailing vehicle). In some examples, the alerts generated by the autonomous vehicle can vary based on one or more factors such as, for example and without limitation, a predicted time to collision, the actors involved in the potential collision and/or threat/risk, the potential severity of such collision, the probability of such collision and/or the confidence level of the autonomous vehicle that such collision may occur, the type of collision, the conditions in the environment associated with the potential collision, and/or any other factors.

In some cases, the autonomous vehicle can additionally or alternatively transmit similar alert information to a party at risk of being harmed by the leading vehicle if a collision occurs, such as a pedestrian, a motorcyclist, or any road user. In some examples, if the autonomous vehicle has no occupants and can reduce the threat of collision through one or more vehicle maneuvers, the autonomous vehicle may proactively get in the way of the trailing vehicle and slowly reduce its speed to thereby cause the trailing vehicle to also reduce its speed and avoid a collision with another road user such as a pedestrian, a motorcyclist, a driver of another vehicle, etc. In some aspects, the autonomous vehicle can use a V2V communication signal to transmit to the leading vehicle an alert that the leading vehicle can use as an input to the leading vehicle's planning stack to take and/or determine an action to take to avoid the collision and/or mitigate the threat/risk.

In some examples, the autonomous vehicle can modify one or more characteristics of an alert based on one or more factors such as, a reduced estimated time to collision, an increase in a risk of collision, an increase in the potential severity of a collision, etc. For example, with respect to visual alerts, to indicate an increase in a collision risk, an increase in a severity of a potential collision, a decrease in an estimated time to collision, etc., the autonomous vehicle can change a color of a visual alert, change a pattern of a visual alert, change a frequency of the visual alert and/or a pattern of a visual alert, change a volume/number of visual alerts, change what is depicted in the visual alerts, etc. As another example, with respect to audio alerts, to indicate an increase in a collision risk, an increase in a severity of a potential collision, a decrease in an estimated time to collision, etc., the autonomous vehicle can change a volume of an audio alert, change a pattern of an audio alert, change a frequency of the audio alert, change the information conveyed through an audio alert, and/or change any characteristics of an audio alert.

In some cases, the systems and techniques described herein can use vehicle infrastructure to provide alerts to road users, vehicles, etc. For example, the systems and techniques described herein can use sensors on a traffic sign to detect a potential collision and warn one or more parties of the potential collision. The traffic sign can include an output device(s), such as a speaker(s), a display(s), a projector(s), a lighting system(s), a network communication interface (e.g., a V2E interface, a wireless antenna, etc.), and/or any other output device. The traffic sign can use such output device(s) to output an alert for one or more parties of a potential collision, as previously explained.

Examples of the systems and techniques described herein are illustrated in FIG. 1 through FIG. 7 and described below.

FIG. 1 is a diagram illustrating an example autonomous vehicle (AV) environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and/or the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and/or other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUS, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162 and/or a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. In some cases, the client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit to a pick-up or drop-off location, and so on.

While the AV 102, the local computing device 110, and the autonomous vehicle environment 100 are shown to include certain systems and components, one of ordinary skill will appreciate that the AV 102, the local computing device 110, and/or the autonomous vehicle environment 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
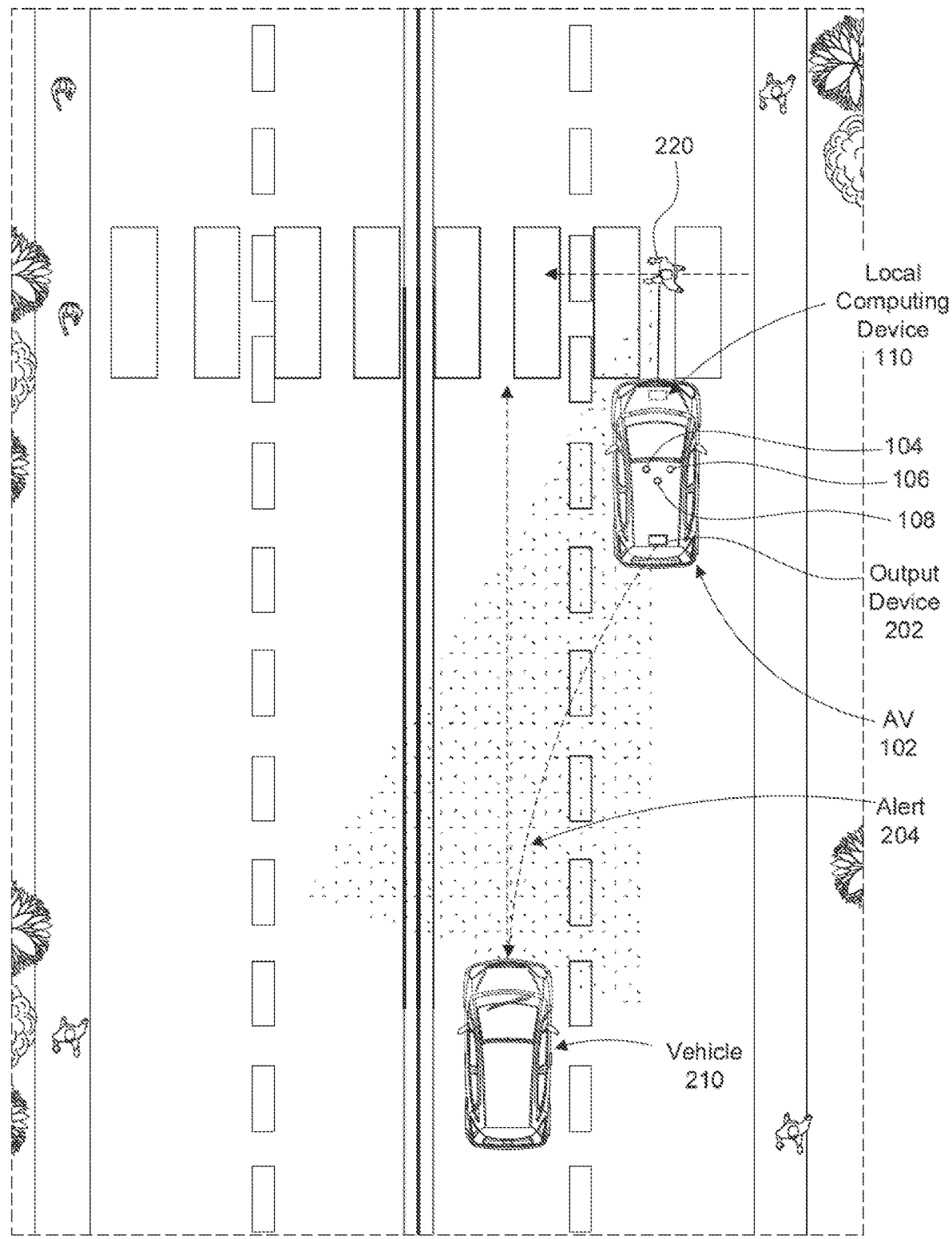
FIG. 2 is a diagram illustrating an example threat detection alert generated by an autonomous vehicle for a trailing vehicle, in accordance with some examples of the present disclosure.

FIG. 2 is a diagram illustrating an example threat detection alert generated by the autonomous vehicle 102 for a trailing vehicle 210. In this example, the autonomous vehicle 102 has detected a pedestrian 220 crossing the street through a pedestrian crosswalk. The autonomous vehicle 102 can use the sensor systems 104, 106, and/or 108 to detect the pedestrian 220 and a trajectory of the pedestrian 220. In addition, the autonomous vehicle 102 has detected the trailing vehicle 210 and a trajectory of the trailing vehicle 210 using the sensor systems 104, 106, and/or 108.

Based on the estimated trajectory of the pedestrian 220 and the estimated trajectory of the trailing vehicle 210, the autonomous vehicle 102 has detected a potential collision between the trailing vehicle 210 and the pedestrian 220. In some cases, the autonomous vehicle 102 can determine that the pedestrian 220 is occluded by the autonomous vehicle 102 from a view or a FOV of sensors on the trailing vehicle 210 and/or a driver of the trailing vehicle 210. For example, the autonomous vehicle 102 can use the location of the autonomous vehicle 102 and the relative locations and/or trajectories of the trailing vehicle 210 and the pedestrian 220 to determine that the autonomous vehicle 102 is occluding/obstructing a view/visibility of the pedestrian 220 by a driver of the trailing vehicle 210 and/or sensors of the trailing vehicle 210. In other words, the autonomous vehicle 102 can determine that a driver of the trailing vehicle 210 and/or sensors of the trailing vehicle 210 are not able to see (or have a certain probability of not being able to see) the pedestrian 220 as the pedestrian 220 crosses the street. Based on the determination that a driver of the trailing vehicle 210 and/or sensors of the trailing vehicle 210 are not able to see (or have a certain probability of not being able to see) the pedestrian 220 as the pedestrian 220 crosses the street as well as the detected trajectories of the trailing vehicle 210 and the pedestrian 220, the autonomous vehicle 102 can determine a probability of a potential collision between the trailing vehicle 210 and the pedestrian 220.

For example, in some cases, the autonomous vehicle 102 can calculate (e.g., using sensor systems 104, 106, and/or 108) an estimated FOV of the trailing vehicle 210 (e.g., of a driver of the trailing vehicle 210 and/or sensors on the trailing vehicle 210) based on the location of the trailing vehicle 210 (and/or a trajectory of the trailing vehicle 210) and an estimated FOV of the pedestrian 220 based on the location of the pedestrian 220 (and/or a trajectory of the pedestrian 220). Based on the estimated FOV of the trailing vehicle 210, the estimated FOV of the pedestrian 220, the location of the autonomous vehicle 102, the location of the trailing vehicle 210 (and/or the trajectory of the trailing vehicle 210), and/or the location of the pedestrian 220 (and/or the trajectory of the pedestrian 220), the autonomous vehicle 102 can determine that the pedestrian 220 is (or will be) outside of the FOV of the trailing vehicle 210 and/or a view of the trailing vehicle 210 to the pedestrian 220 is (or will be) occluded/obstructed. The autonomous vehicle 102 can then determine a potential collision between the trailing vehicle 210 and the pedestrian 220 based on their respective trajectories and the determination that the pedestrian 220 is (or will be) outside of the FOV of the trailing vehicle 210 and/or a view of the trailing vehicle 210 to the pedestrian 220 is (or will be) occluded/obstructed.

In some examples, the autonomous vehicle 102 can determine a probability/likelihood that the trailing vehicle 210 and the pedestrian 220 may collide if the trailing vehicle 210 does not take a preventative action within a certain amount of time. In some cases, the autonomous vehicle 102 can also determine a time-to-collision (e.g., an amount of time until the trailing vehicle 210 and the pedestrian 220 may collide given their respective trajectories).

To prevent or mitigate a collision between the trailing vehicle 210 and the pedestrian 220, the autonomous vehicle 102 can use an output device 202 to output an alert 204 that notifies the trailing vehicle 210 of the potential collision between the trailing vehicle 210 and the pedestrian 220. In some examples, the output device 202 can be aimed at the trailing vehicle 210 and/or can output the alert 204 towards and/or in the general direction of the trailing vehicle 210. The alert 204 can include an audio alert (e.g., a sound, a voice message, an audio pattern, etc.), a visual alert (e.g., a light, a video, a projection, an image, a visual pattern, etc.), and/or a wireless signal (e.g., a V2V communication signal, a Bluetooth signal, a WIFI signal, a cellular wireless signal, etc.).

The alert 204 can indicate to the trailing vehicle 210 that there is or will be a potential threat or risk in the path (or a future path) of the trailing vehicle 210. This way, the trailing vehicle 210 can receive notice of the potential threat (e.g., the pedestrian 220) so the trailing vehicle 210 can take action to prevent or mitigate the risk/threat. In some cases, the alert 204 can be a signal (e.g., visual, audio, wireless) that represents a warning or notification of a potential threat/risk. In some cases, the alert 204 can convey visual, audio, or digital information about the threat/risk, such as a description of the threat/risk, an estimated time-to-collision, a representation of the type of threat/risk, a visualization of the threat/risk, a rendering of the threat/risk, an instruction and/or recommendation of an action to take to prevent or mitigate the threat/risk, etc. In some cases, the alert 204 can include an image, a message, a symbol, a light, a light pattern, a video, an animation, a sound, speech, an instruction, a wireless signal, and/or any other type of alert.

In some cases, the autonomous vehicle 102 can output (e.g., via a speaker device, a display device, etc.) an alert for the pedestrian 220. The alert can warn the pedestrian 220 of a possible collision and/or otherwise inform the pedestrian 220 of the potential threat/risk. The alert to the pedestrian 220 can include, for example and without limitation, an audio alert and/or a visual alert. For example, the autonomous vehicle 102 may output a sound and/or an audio message warning the pedestrian 220 of the possible collision.

While the potential threat in FIG. 2 includes the trailing vehicle 210 and a pedestrian 220, other examples can include a different type and/or number of potentially colliding objects and/or subjects. For example, in some cases, the potential threat can include a potential collision involving multiple vehicles, one or more vehicles and one or more things (e.g., one or more objects, potholes or other road obstacles/defects, animals, transportation systems, road conditions, accidents, etc.), one or more cycles (e.g., motorcycle, bicycle, etc.) and one or more other things (e.g., one or more vehicles, one or more objects, one or more pedestrians, one or more animals, one or more trains, etc.), and/or any other objects, animals, and/or transportation systems (e.g., vehicle, cycle, train, etc.).

Figure 3:
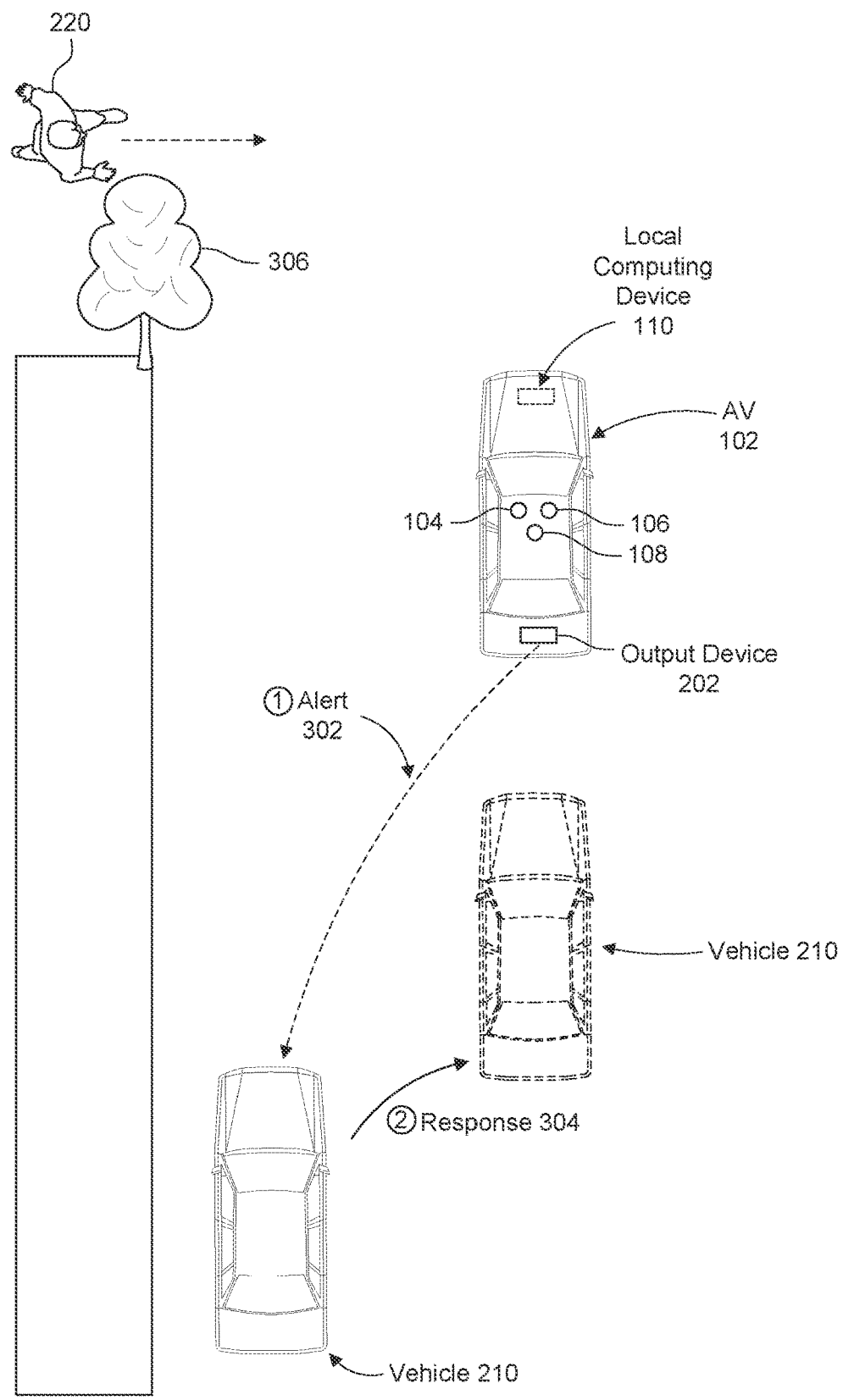
FIG. 3 is a diagram illustrating another example threat detection alert generated by an autonomous vehicle for a trailing vehicle, in accordance with some examples of the present disclosure.

FIG. 3 is a diagram illustrating another example threat detection alert generated by the autonomous vehicle 102 for a trailing vehicle 210. In this example, the autonomous vehicle 102 has similarly detected a pedestrian 220 crossing the street while the trailing vehicle 210 is moving towards the portion of the street that the pedestrian 220 is predicted to cross. The autonomous vehicle 102 can use the sensor systems 104, 106, and/or 108 to detect the pedestrian 220 and a trajectory of the pedestrian 220. The autonomous vehicle 102 can also detect the trailing vehicle 210 and a trajectory of the trailing vehicle 210 using the sensor systems 104, 106, and/or 108.

Based on the estimated trajectory of the pedestrian 220 and the estimated trajectory of the trailing vehicle 210, the autonomous vehicle 102 can detect a potential collision between the trailing vehicle 210 and the pedestrian 220. For example, given the trajectory of the pedestrian 220, the estimated trajectory of the trailing vehicle 210, and the speed of the trailing vehicle 210 (e.g., detected using the sensor systems 104, 106, and/or 108), the autonomous vehicle 102 can determine that there is a threshold probability that the trailing vehicle 210 and the pedestrian 220 will collide at a future time if a remedial action is not taken in sufficient time to avoid such collision. In some cases, the autonomous vehicle 102 can also determine that the pedestrian 220 is occluded/blocked from a view of one or more sensors and/or a driver of the trailing vehicle 210.

For example, in the illustrative example shown in FIG. 3, the autonomous vehicle 102 can detect that a tree 306 obstructs a view of the pedestrian 220 from a perspective of the trailing vehicle 210 (e.g., from a perspective of one or more sensors and/or a driver of the trailing vehicle 210). In some cases, the autonomous vehicle 102 can determine relative positions (and/or trajectories) of the pedestrian 220 and the trailing vehicle 210 and, based on the relative positions (and/or trajectories) of the pedestrian 220 and the trailing vehicle 210, determine that a view from the trailing vehicle 210 (e.g., a visibility path and/or a portion of a FOV of the trailing vehicle 210 corresponding to a location of the pedestrian 220) to the pedestrian 220 is at least partially blocked by the tree 306.

In some examples, the autonomous vehicle 102 can estimate a FOV of the trailing vehicle 210 (e.g., a FOV of one or more sensors and/or a driver of the trailing vehicle 210), and determine that a portion of the FOV of the trailing vehicle 210 that includes the location of the pedestrian 220 is blocked by the tree 306. The autonomous vehicle 102 can determine that a portion of the FOV of the trailing vehicle 210 that includes the location of the pedestrian 220 is blocked by the tree 306 based on a position of the pedestrian 220, a position of the trailing vehicle 210, a position of the tree 306, a size and/or shape of the tree 306, a size and/or shape of the pedestrian 220, an angle between the trailing vehicle 210 and the pedestrian 220 (and, in some cases, the tree 306), and/or a distance between the trailing vehicle 210 and the pedestrian 220 (and in some cases, the tree 306), a distance and/or angle between the pedestrian 220 and the tree 306, and/or visibility conditions (e.g., an amount of light in the scene, weather conditions in the scene, etc.).

While FIG. 3 illustrates a tree as an example obstruction of the view of the trailing vehicle 210 to the pedestrian 220, other examples can include other obstructions/occlusions. To illustrate, in other examples, the view of the pedestrian 220 from the perspective of the trailing vehicle 210 can be obstructed/occluded by, for example and without limitation, another pedestrian, another vehicle, a sign, a building, an animal, an object, a shadow, snow, a guardrail, a cone, litter, and/or any other obstruction/occlusion.

In some examples, the autonomous vehicle 102 can detect a potential collision between the trailing vehicle 210 and the pedestrian 220 based on a position (and/or estimated trajectory) of the pedestrian 220 and a position (and/or estimated trajectory) of the trailing vehicle 210 as well as a determination that a view of the pedestrian 220 from a perspective of the trailing vehicle 210 is obstructed/occluded. In some cases, the autonomous vehicle 102 can detect (e.g., using sensor data such as image data or video frames, inertial measurements, location measurements, motion measurements, etc.) a potential collision between the trailing vehicle 210 and the pedestrian 220 based on a position (and/or estimated trajectory) of the pedestrian 220 and a position (and/or estimated trajectory) of the trailing vehicle 210 as well as an angle between the trailing vehicle 210 and the pedestrian, an angle between the trailing vehicle 210 and the tree 306, an angle between the tree 306 and the pedestrian 220, a distance between the trailing vehicle 210 and the pedestrian 220, a distance between the trailing vehicle 210 and the tree 306, a distance between the tree 306 and the pedestrian 220, a size and/or shape of the pedestrian 220 and/or the tree 306, visibility conditions (e.g., an amount of light in the scene), and/or a speed of the trailing vehicle 210 and/or the pedestrian 220.

In response to detecting the potential collision between the trailing vehicle 210 and the pedestrian 220, the autonomous vehicle 102 can generate an alert 302 for the trailing vehicle 210. In some cases, the autonomous vehicle 102 can also generate an alert (not shown) for the pedestrian 220, such as an audio alert (e.g., a sound, speech, etc.), a visual alert (e.g., a video, a light, an image, an animation or depiction, a message, etc.), and/or any other alert as described herein.

The autonomous vehicle 102 can transmit the alert 302 using the output device 202. In this example, the autonomous vehicle 102 transmits the alert 302 (e.g., using the output device 202) via a V2V communication with the trailing vehicle 210. Thus, the alert 302 can include a V2V signal/message to the trailing vehicle 210. The alert 302 can include information about the threat (e.g., the potential collision between the trailing vehicle 210 and the pedestrian 220).

For example, the alert 302 can include an instruction on one or more potential actions that the trailing vehicle 210 can implement to avoid or mitigate the collision, an indication of the potential threat, and/or a description of the potential threat such as, for example, a location and/or trajectory of the pedestrian 220, a probability that the trailing vehicle 210 and the pedestrian 220 will collide if remedial action is not taken within a certain amount of time, an estimated time of impact between the trailing vehicle 210 and the pedestrian 220, motion information about the pedestrian 220 (e.g., direction, speed, etc.), an estimated location of the pedestrian 220 at the estimated time of impact between the trailing vehicle 210 and the pedestrian 220, and/or any other information about the potential threat.

In the illustrative example shown in FIG. 3, the trailing vehicle 210 represents an autonomous vehicle or a semi-autonomous vehicle and the alert 302 includes information that the trailing vehicle 210 can provide as an input to a planning stack of the trailing vehicle 210 so the planning stack can take the information from the alert 302 into account when making driving decisions. As shown, after receiving the alert 302, the trailing vehicle 210 has executed a response 304 to the alert 302. The response 304 can be an action intended to prevent or mitigate the potential collision with the pedestrian 220. In this example, the response 304 includes switching to the lane of the autonomous vehicle 102 and slowing down in order to avoid the collision with the pedestrian 220. The trailing vehicle 210 can move behind the autonomous vehicle 102 to place a buffer between the trailing vehicle 210 and the pedestrian 220. In other examples, the response 304 can include any other action intended to prevent or mitigate the collision with the pedestrian 220 such as, for example and without limitation, slowing down (with or without switching lanes), stopping before the estimated location of the pedestrian 220 at the estimated time of impact/collision, activating one or more systems (e.g., a horn, headlights, a speaker, etc.) of the trailing vehicle 210 to warn the pedestrian 220 and/or prompt the pedestrian 220 to take action (e.g., stop, retreat, etc.) to prevent the collision, change the trajectory of the trailing vehicle 210 to try to avoid the pedestrian 220, etc.

In some cases, the response 304 can at least partly depend on one or more factors such as, for example and without limitation, the estimated amount of time until the trailing vehicle 210 and the pedestrian 220 are predicted to collide (e.g., with more time until the potential collision the trailing vehicle 210 may have more possible actions to implement to prevent or mitigate the collision and with less time until the potential collision the trailing vehicle 210 may have less options of actions it can take to prevent or mitigate the collision), the amount of traffic around the trailing vehicle 210, whether the trailing vehicle 210 can safely decelerate and/or switch lanes to avoid the potential collision, weather conditions that may affect the ability of the trailing vehicle 210 to safely decelerate and/or maneuver to avoid the collision, the trajectory of other vehicles on the road and/or surrounding the trailing vehicle 210, the technical capabilities of the trailing vehicle 210, the speed of the trailing vehicle 210, one or more characteristics of the environment around the trailing vehicle 210, a risk assessment of one or more potential actions that the trailing vehicle 210 may take, and/or any other factors.

In some examples, the response 304 can be determined by the planning stack of the trailing vehicle 210 using information from the alert 302 as well as any other information such as, for example and without limitation, map information, global positioning system (GPS) information, traffic information, routing information, other planning and/or predictive information, sensor data, driving parameters and/or rules, road information, preferences, statistics, information about vehicle capabilities, weather information, traffic signaling information, etc. Thus, the planning stack can use information from the alert 302 as an input to calculate the response 304 and take an action to prevent or mitigate the collision with the pedestrian 220.

In some cases, the alert 302 can include an instruction to a driver of the trailing vehicle 210 indicating one or more suggested actions that the driver can take to prevent or mitigate the collision with the pedestrian 220. For example, the alert 302 can include an instruction for the driver to stop the trailing vehicle 210, slow down the trailing vehicle 210, switch lanes, activate a horn of the trailing vehicle 210, activate a headlight of the trailing vehicle 210, and/or any other suggested actions. The driver of the trailing vehicle 210 can receive such instruction by audio (e.g., via a speaker of the trailing vehicle 210), video (e.g., via a display of the trailing vehicle 210), as a message displayed on a display of the trailing vehicle 210 and/or a mobile device of the driver, an image(s) displayed on a display of the trailing vehicle 210, and/or by any other means.

While the potential threat in FIG. 3 includes the trailing vehicle 210 and a pedestrian 220, other examples can include a different type and/or number of potentially colliding objects and/or subjects. For example, in some cases, the potential threat can include a potential collision involving multiple vehicles, one or more vehicles and one or more objects, one or more cycles (e.g., motorcycle, bicycle, etc.) and one or more other things (e.g., one or more vehicles, one or more objects, one or more pedestrians, one or more animals, one or more trains, etc.), and/or any other objects, animals, and/or transportation systems (e.g., vehicle, cycle, train, etc.).

Figure 4:
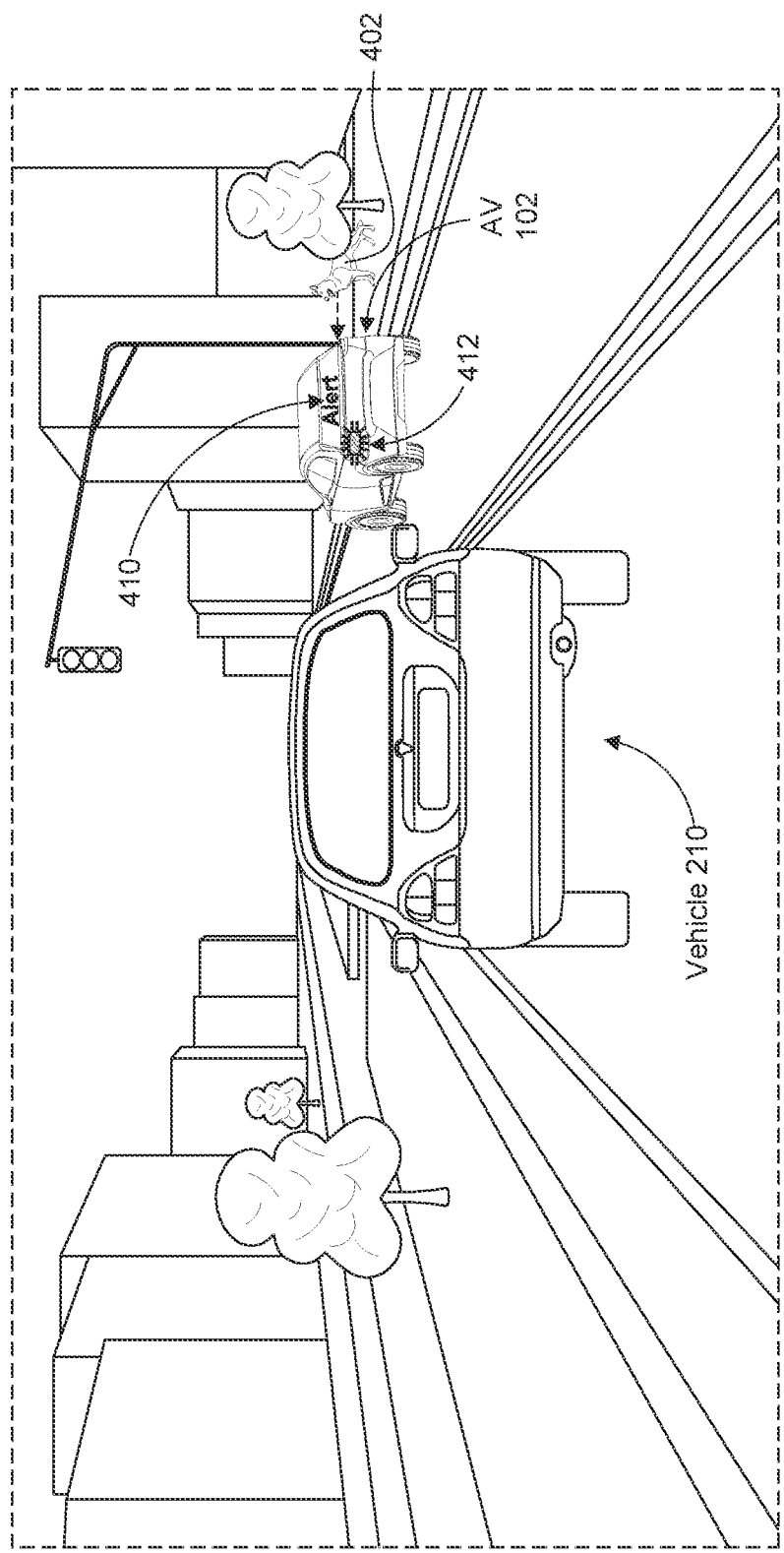
FIG. 4 is a diagram illustrating another example threat detection alert generated by an autonomous vehicle, in accordance with some examples of the present disclosure.

FIG. 4 is a diagram illustrating another example threat detection alert generated by the autonomous vehicle 102. In this example, the autonomous vehicle 102 has detected an animal 402 that the autonomous vehicle 102 predicts will cross a path of the trailing vehicle 210 based on the trajectory of the animal 402 and the trajectory of the trailing vehicle 210. The autonomous vehicle 102 has also determined that the animal 402 is occluded from a view of the trailing vehicle 210 (e.g., from sensors of the trailing vehicle 210) and/or a driver of the trailing vehicle 210.

For example, the autonomous vehicle 102 can determine, based on the respective positions of the animal 402, the trailing vehicle 210, and the autonomous vehicle 102 blocking a view to the animal 402 from the perspective of the trailing vehicle 210, that a view of the animal 402 from the perspective (e.g., from the position) of sensors on the trailing vehicle 210 and/or a driver of the trailing vehicle 210 is blocked/occluded by the autonomous vehicle 102 and thus the trailing vehicle 210 may not be able to see the animal 402 in time to avoid colliding with it. In some cases, the autonomous vehicle 102 can estimate a FOV of any sensors on the trailing vehicle 210 and/or a driver of the trailing vehicle 210, and determine that the animal 402 is not within the FOV of the sensors and/or the driver of the trailing vehicle 210 and/or a view of the sensors and/or driver of the trailing vehicle 210 to the animal 402 is obstructed given the estimated FOV of the sensors and/or driver of the trailing vehicle 210 and the position of the animal 402, the position of the autonomous vehicle 102, and the position of the trailing vehicle 210.

In response to determining that the animal 402 and the trailing vehicle 210 are on a collision trajectory, the autonomous vehicle 102 can generate visual alert 410 and/or visual alert 412 to warn the trailing vehicle 210 of the potential threat (e.g., the animal 402 predicted to collide with the trailing vehicle 210). In some examples, the autonomous vehicle 102 can generate visual alert 410 and/or visual alert 412 in response to both the detected threat and the determination that the animal 402 is not within the FOV of the sensors and/or the driver of the trailing vehicle 210 and/or a view of the sensors and/or driver of the trailing vehicle 210 to the animal 402 is obstructed (e.g., by the autonomous vehicle 102).

In this example, the visual alert 410 can include visual content displayed on a display device of the autonomous vehicle 102 that is facing towards the trailing vehicle 210. The display device can include, for example and without limitation, a screen with displaying capabilities, a window (e.g., the back window) with displaying capabilities, a projector that projects visual content on a surface (e.g., a surface of the autonomous vehicle 102, a surface of the trailing vehicle 210, or any surface outside of the autonomous vehicle 102, a head-up display (HUD), or any other display device. The visual alert 410 can be displayed in a direction towards the trailing vehicle 210 (e.g., facing the trailing vehicle 210) so it can be detected by sensors of the trailing vehicle 210 and/or a driver of the trailing vehicle 210. In some cases, the visual alert 410 can include a video conveying and/or depicting the potential threat, an image conveying and/or depicting the potential threat, a message conveying and/or describing the potential threat, a message indicating that there is a potential threat and/or providing instructions for preventing or mitigating the potential threat, a flashing light, and/or a pattern of light (e.g., a pattern of colors, light intensities, output or flashing frequencies and/or patterns, etc.).

In some examples, the visual alert 410 can include a pattern of light and the pattern of light can vary based on one or more factors such as, for example, an estimated time to collision, a speed of the trailing vehicle 210, a type of threat, a severity of the potential threat (e.g., how much harm the potential threat can cause to life and/or property), a probability of the potential threat being realized (e.g., a probability of collision), visibility conditions of the environment, a distance between the trailing vehicle 210 and the autonomous vehicle 102, and/or any other factors. The pattern of light can also change as one or more factors change. For example, the pattern of light can change as the estimated time of collision decreases, the distance between the trailing vehicle 210 and the animal 402 decreases, the distance between the trailing vehicle 210 and the autonomous vehicle 102 decreases, any changes or lack of changes in a behavior and/or trajectory of the trailing vehicle 210 and/or the animal 402, and/or any other factors or changes. To illustrate, as the estimated time of collision and/or the distance between the trailing vehicle 210 and the animal 402 decreases, the light associated with the visual alert 410 can flash at a higher frequency to signify an increasingly imminent threat. As another illustrative example, as the estimated time of collision and/or the distance between the trailing vehicle 210 and the animal 402 decreases, the color of light emitted by the visual alert 410 can change (e.g., from green to yellow, from yellow to red, etc.) to signify an increasingly imminent threat.

In some cases, the type of visual alert can change as one or more factors and/or circumstances change. For example, when the trailing vehicle 210 is a threshold distance away from the autonomous vehicle 102 such that it would be difficult to see (e.g., by sensors and/or a driver of the trailing vehicle 210) a message or video displayed by the autonomous vehicle 102 for the trailing vehicle 210, the autonomous vehicle 102 can emit light or a pattern of light as the visual alert 410 for the trailing vehicle 210. Subsequently, when the trailing vehicle 210 is closer to the autonomous vehicle 102 (e.g., within a distance estimated to be sufficiently close to the autonomous vehicle 102 to allow sensors and/or a driver of the trailing vehicle 210 to see a message or video displayed by the autonomous vehicle 102), the visual alert 410 can change from emitted light or a pattern of emitted light to a message and/or video for the trailing vehicle 210.

In some cases, the autonomous vehicle 102 can additionally or alternatively output the visual alert 412. For example, the autonomous vehicle 102 can output the visual alert 412 in addition to or in lieu of outputting the visual alert 410. The autonomous vehicle 102 can output the visual alert 412 towards the trailing vehicle 210 so it can be perceived by sensors of the trailing vehicle 210 and/or a driver of the trailing vehicle 210. Moreover, the autonomous vehicle 102 can output the visual alert 412 in response to determining that the animal 402 and the trailing vehicle 210 are on a collision trajectory and optionally further in response to a determination that the animal 402 is not within the FOV of the sensors and/or the driver of the trailing vehicle 210 and/or a view of the sensors and/or driver of the trailing vehicle 210 to the animal 402 is obstructed (e.g., by the autonomous vehicle 102).

In this example, the visual alert 412 includes light or a pattern of light emitted by a lighting system of the autonomous vehicle 102. The lighting system of the autonomous vehicle 102 can include a tail light(s) of the autonomous vehicle 102, an external display device on the autonomous vehicle 102, a separate light bulb/lamp of the autonomous vehicle 102, a light-emitting diode (LED) on a surface of the autonomous vehicle 102, and/or any light emitting device on the autonomous vehicle 102.

In some examples, the visual alert 412 can include a color of light and/or a pattern of light that is based on and/or can vary based on one or more factors such as, for example, an estimated time to collision, a speed of the trailing vehicle 210, a type of threat, a severity of the potential threat (e.g., how much harm the potential threat can cause to life and/or property), a probability of the potential threat being realized (e.g., a probability of collision), visibility conditions of the environment, a distance between the trailing vehicle 210 and the autonomous vehicle 102, and/or any other factors. For example, the visual alert 412 can include a color or pattern of light that changes as the estimated time of collision decreases, the distance between the trailing vehicle 210 and the animal 402 decreases, the distance between the trailing vehicle 210 and the autonomous vehicle 102 decreases, any changes or lack of changes in a behavior and/or trajectory of the trailing vehicle 210 and/or the animal 402, and/or any other factors or changes.

While the potential threat in FIG. 4 includes the trailing vehicle 210 and an animal 402, other examples can include a different type and/or number of potentially colliding things. For example, in some cases, the potential threat can include a potential collision involving multiple vehicles, one or more vehicles and one or more objects, one or more cycles (e.g., motorcycle, bicycle, etc.) and one or more other things (e.g., one or more vehicles, one or more objects, one or more pedestrians, one or more trains, etc.), and/or any other objects and/or transportation systems (e.g., vehicle, cycle, train, etc.).

Figure 5:
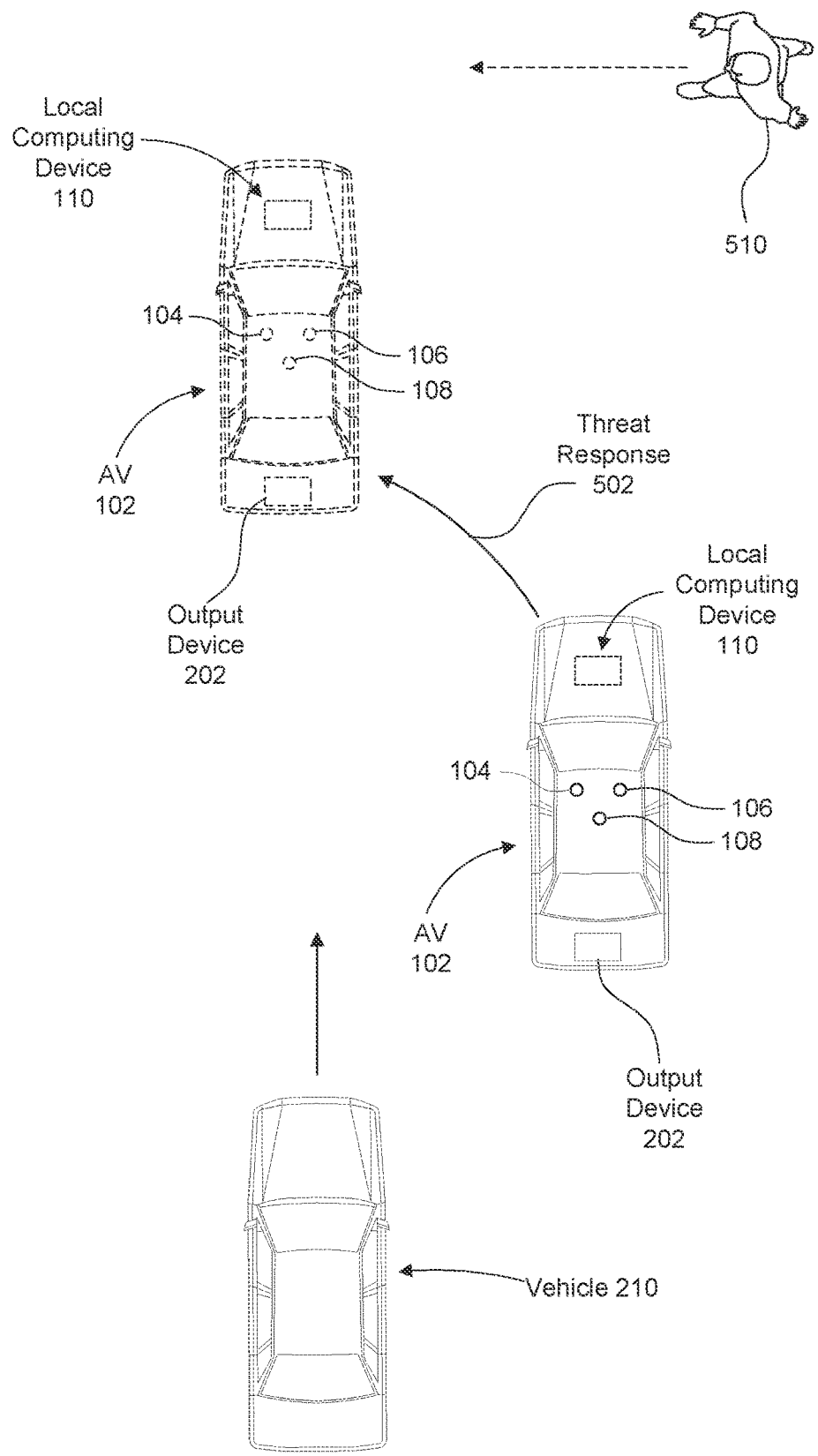
FIG. 5 is a diagram illustrating an example response to a detected threat, in accordance with some examples of the present disclosure.

FIG. 5 is a diagram illustrating an example response to a detected threat. In this example, the autonomous vehicle 102 has detected a potential threat involving a pedestrian 510 and a trailing vehicle 210 estimated to cross paths and collide if remedial action is not taken in sufficient time. For example, the autonomous vehicle 102 can determine that the pedestrian 510 and the trailing vehicle 210 are set to collide based on their respective trajectories. The autonomous vehicle 102 can detect the threat based on the determination that the pedestrian 510 and the trailing vehicle 210 are set to collide. In some cases, the autonomous vehicle 102 can detect the threat further based on an additional determination that a view of the pedestrian 510 from the trailing vehicle 210 (e.g., from one or more sensors of the trailing vehicle 210 and/or a driver of the trailing vehicle 210) is blocked/occluded (e.g., by the autonomous vehicle 102 and/or any other thing) and/or that the pedestrian 510 is not (or will not) be within a FOV of one or more sensors and/or a driver of the trailing vehicle 210.

Based on the detected threat, the autonomous vehicle 102 can initiate a threat response 502. In this example, the threat response 502 includes switching lanes to block the trailing vehicle 210 from colliding with the pedestrian 510. If necessary, when switching lanes, the autonomous vehicle 102 can also slow down and/or stop if it can do so safely. By slowing down and/or stopping when the autonomous vehicle 102 is in front of the trailing vehicle 210, the autonomous vehicle 102 can force the trailing vehicle 210 to also slow down and/or stop and thus prevent the trailing vehicle 210 from colliding with the pedestrian 510.

In some cases, the autonomous vehicle 102 can perform the threat response 502 any time it detects a threat involving the trailing vehicle 210 if the autonomous vehicle 102 determines that it can do so safely. In other cases, the autonomous vehicle 102 may only perform the threat response 502 if it determines that an alert as shown in FIG. 2, 3, or 4 is unlikely to prevent or mitigate a collision between the trailing vehicle 210 and the pedestrian 510. For example, the autonomous vehicle 102 may perform the threat response 502 if it determines that the trailing vehicle 210 (and/or the pedestrian 510) would not be able to perceive (e.g., detect, hear, see, etc.) or perceive in time an alert from the autonomous vehicle 102 or if the autonomous vehicle 102 estimates that the trailing vehicle 210 (and/or the pedestrian 510) is unlikely to be able to respond to an alert from the autonomous vehicle 102 in sufficient time to prevent or mitigate a collision with the pedestrian 510.

In some examples, the autonomous vehicle 102 may determine that the trailing vehicle 210 (and/or the pedestrian 510) would not be able to perceive or perceive in time an alert from the autonomous vehicle 102 or is unlikely to be able to respond to an alert from the autonomous vehicle 102 in sufficient time to prevent or mitigate a collision with the pedestrian 510 based on one or more factors. The one or more factors can include, for example and without limitation, a distance between the pedestrian 510 and the trailing vehicle 210, respective trajectories of the pedestrian 510 and the trailing vehicle 210, a speed of the trailing vehicle 210, a road condition (e.g., wet, dry, icy, snowy, damaged, etc.), a type of road (e.g., highway, residential street, gravel road, dirt road, etc.), visibility conditions (e.g., foggy, snowy, dark, light, rainy, visibility below a threshold, etc.), a type of vehicle of the trailing vehicle 210 (e.g., a bus, a truck, a trailer, a van, a passenger car, an autonomous vehicle, a motorcycle, a bicycle, etc.), traffic conditions, the types and/or amounts (if any) of unobstructed spaces in the road ahead of the trailing vehicle 210, and/or any other factors.

For example, the autonomous vehicle 102 can estimate a time and location of collision between the pedestrian 510 and the trailing vehicle 210. The autonomous vehicle 102 can then determine that, given the time and location of collision between the pedestrian 510 and the trailing vehicle 210, the trailing vehicle 210 (and/or the pedestrian 510) would not be able to perceive or perceive in time an alert from the autonomous vehicle 102 or is unlikely to be able to respond to an alert from the autonomous vehicle 102 in sufficient time to prevent or mitigate a collision with the pedestrian 510. In response, the autonomous vehicle 102 can decide to perform the threat response 502 in lieu of (or in addition to) generating an alert such as the alerts described above with respect to FIGS. 2, 3, and 4.

In some cases, the autonomous vehicle 102 can perform a different threat response than the threat response 502 described above (in addition to the threat response 502 or in lieu of the threat response 502). For example, the autonomous vehicle 102 can begin to switch lanes towards the lane of the trailing vehicle 210 without actually completely switching lanes, in order to cause the trailing vehicle 210 to slow down in response to a potential lane change by the autonomous vehicle 102. In other words, the autonomous vehicle 102 can move/gesture as if it is beginning a lane switch in order to trigger the trailing vehicle 210 to slow down in order to avoid colliding with the autonomous vehicle 102. The autonomous vehicle 102 can perform such threat response if it determines it can do so without causing another collision or harm to any lives.

In some cases, the different threat response can include an intentional collision caused by the autonomous vehicle 102 between the autonomous vehicle 102 and the trailing vehicle 210 to prevent the trailing vehicle 210 from colliding with the pedestrian 510 and potentially harming the pedestrian 510. The autonomous vehicle 102 may only intentionally cause such collision if there are no passengers in the autonomous vehicle 102 or the trailing vehicle 210 and the autonomous vehicle 102 determines that such collision may prevent harm to the pedestrian 510 without causing harm to any other lives.

Figure 6:
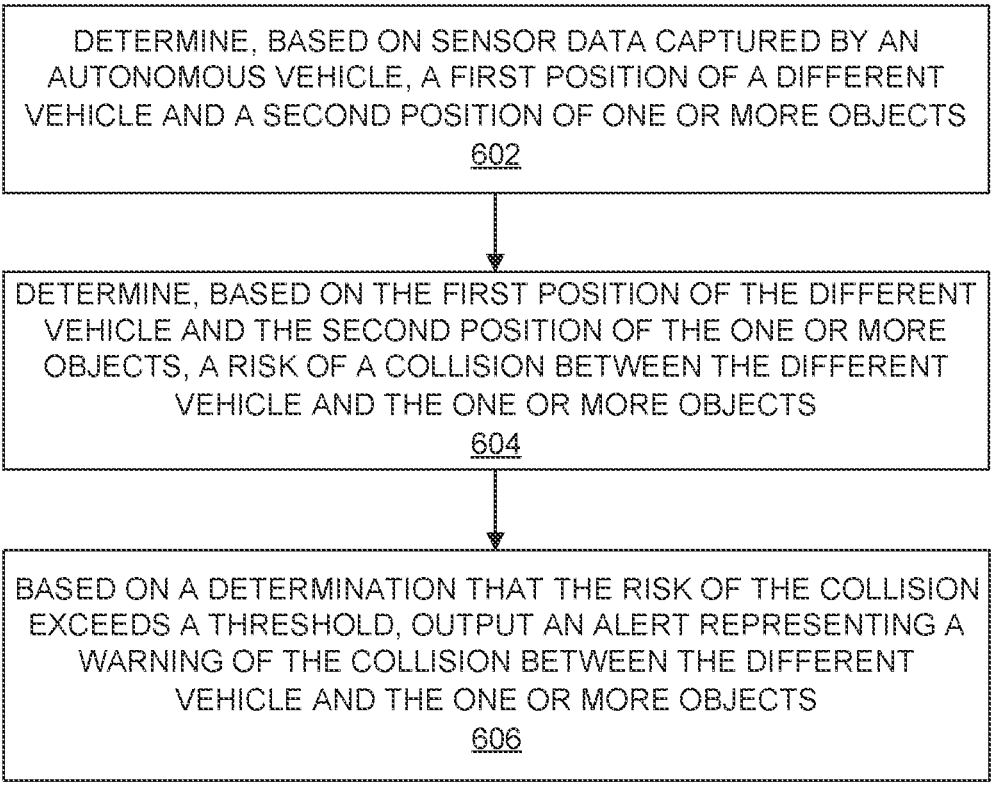
FIG. 6 is a flowchart illustrating an example process for implementing a predictive threat warning system for vehicles, in accordance with some examples of the present disclosure.

FIG. 6 is a flowchart illustrating an example process 600 for implementing a predictive threat warning system for vehicles. At block 602, the process 600 can include determining, based on sensor data captured by an autonomous vehicle (e.g., AV 102), a first position of a different vehicle (e.g., trailing vehicle 210) and a second position of one or more objects.

At block 604, the process 600 can include determining, based on the first position of the different vehicle and the second position of the one or more objects, a risk of a collision between the different vehicle and the one or more objects. In some examples, the one or more objects can include a person, an animal, an object, a vehicle, and/or a road obstacle (e.g., a pothole, a road block, a guardrail, a cone, litter, a tree, a power line, etc.).

At block 606, the process 600 can include based on a determination that the risk of the collision exceeds a threshold, outputting an alert representing a warning of the collision between the different vehicle and the one or more objects. In some examples, the alert can be directed to (e.g., sent in the direction of and/or wirelessly transmitted to) the different vehicle and/or the one or more objects. For example, the autonomous vehicle can output an audio and/or visual signal towards the different vehicle and/or the one or more objects. As another example, the autonomous vehicle can send a wireless signal including the alert to the different vehicle and/or the one or more objects.

In some aspects, the process 600 can include determining, based on the sensor data, a first trajectory of the different vehicle and a second trajectory of the one or more objects, and determining the risk of the collision further based on the first trajectory and the second trajectory. In some examples, determining the risk of the collision can include determining, based on the first trajectory of the different vehicle and the second trajectory of the one or more objects, that the different vehicle and the one or more objects are in a trajectory to intersect within at least a threshold period of time, and determining the risk of the collision further based on the determining that the different vehicle and the one or more objects are in the trajectory to intersect within at least the threshold period of time.

In some cases, outputting the alert can include sending a vehicle-to-vehicle (V2V) wireless communication signal to a computer system of the different vehicle and/or a software planning stack implemented by the computer system of the different vehicle. The V2V wireless communication signal can include the alert. In some examples, the V2V wireless communication signal can be configured to trigger an action or behavior modification of the different vehicle by a software planning stack of the different vehicle and/or supplement the information used by the software planning stack of the different vehicle to determine how to response to the risk of collision.

The alert can include, for example and without limitation, a description of the risk of the collision (e.g., an indication of who/what may be involved in the collision, an estimated time to collision, an estimated location of the collision, an estimated cause of the collision, an estimated severity of the collision, a probability of the collision, etc.), an indication of one or more actions that the different vehicle can perform to avoid the collision (e.g., stop, slow down, switch lanes, make a turn, honk the horn, decelerate or accelerate a certain amount, etc.), and/or at least a portion of the sensor data (e.g., image data from one or more camera sensors, RADAR data, LIDAR data, inertial measurements, location data, etc.). In some examples, the alert can include an instruction for a software planning stack of the different vehicle, sensor data associated with the one or more objects (and/or the risk of collision), and/or one or more parameters for a software planning stack of the different vehicle. In other examples, the alert can include a visual depiction on a presentation device, such as a depiction of the one or more objects or the different vehicle, a visualization or animation of the collision, a depiction of a recommended action to avoid or mitigate the collision, etc.

In some aspects, the process 600 can include determining, based on the sensor data, a speed and direction of the different vehicle, a speed and direction of the one or more objects, and a distance between the different vehicle and the one or more objects at one or more periods of time; and determining the risk of the collision further based on the speed and direction of the different vehicle, the speed and direction of the one or more objects, and the distance between the different vehicle and the one or more objects at the one or more periods of time.

In some aspects, the process 600 can include based on the first position of the different vehicle, the second position of the one or more objects, and a third position of the autonomous vehicle, determining that a first view from the first position of the different vehicle to the second position of the one or more objects is obstructed by the autonomous vehicle and/or a second view from the second position of the one or more objects to the first position of the different vehicle is obstructed by the autonomous vehicle; and outputting the alert in response to determining that the first view and/or the second view is obstructed by the autonomous vehicle.

In some aspects, the process 600 can include determining one or more estimated field-of-views (FOVs) based on the first position of the different vehicle and the second position of the one or more objects. In some examples, the one or more estimated FOVs can include a first FOV from the first position of the different vehicle and/or a second FOV from the second position of the one or more objects. The first FOV can correspond to an estimated view of a driver of the different vehicle and/or one or more sensors on the different vehicle. In some aspects, the process 600 can include determining, based on the one or more estimated FOVs and a third position of the autonomous vehicle, that a first view from the first position of the different vehicle to the second position of the one or more objects is obstructed by the autonomous vehicle and/or a second view from the second position of the one or more objects to the first position of the different vehicle is obstructed by the autonomous vehicle, and outputting the alert in response to determining that the first view and/or the second view is obstructed by the autonomous vehicle.

In some cases, the process 600 can include determining that the one or more objects are located (and/or will be located) within a blind spot of the different vehicle. For example, the autonomous vehicle 102 can estimate a visibility and/or FOV of the different vehicle (e.g., of one or more sensors of the different vehicle and/or a driver of the different vehicle) and determine, based on the visibility and/or FOV of the different vehicle, that the different vehicle (e.g., one or more sensors and/or a driver of the different vehicle) does not have visibility (or has below a threshold visibility) of the one or more objects and/or that a portion of the FOV of the different vehicle corresponding to a location of the one or more objects is occluded/obstructed by something (and thus the one or more objects are within a blind spot of the different vehicle) such as, for example and without limitation, a tree, a sign, a pedestrian, a vehicle (e.g., a bus, a van, a truck, a car, a train, a motorcycle, a bicycle, etc.), an animal, a building, a shadow, a guardrail, a structure, an object, etc.). For example, the autonomous vehicle can determine that an object within the FOV of the different vehicle is blocking the different vehicle's ability to view the one or more objects. In some cases, the autonomous vehicle can estimate the different vehicle's visibility of the one or more objects, determine that the different vehicle's visibility of the one or more objects is below a threshold and, in response output to the different vehicle's visibility of the one or more objects being below a threshold, output the alert and/or perform a preventative/mitigation action, such slow down, stop, turn, honk the horn, flash one or more lights, etc.

In some examples, the autonomous vehicle can determine the different vehicle's visibility of the one or more objects based on one or more factors such as, for example and without limitation, an amount of light (e.g., as detected by one or more cameras and/or light sensors) in the scene (and/or in a region associated with the one or more objects), weather conditions (e.g., as determined by one or more cameras of the autonomous vehicle, one or more humidity sensors of the autonomous vehicle, one or more light sensors of the autonomous vehicle, weather data, one or more smoke detector sensors, and/or any other sensors or weather data sources) affecting a visibility of the different vehicle (e.g., such as snow, fog, rain, smoke, etc.), a distance and/or angle between the different vehicle and the one or more objects, one or more occlusions (e.g., a pedestrian, an animal, a vehicle, an object, a building, a sign, a tree, etc.) at least partially blocking a view of the one or more objects from a perspective of the different vehicle (e.g., from a position and/or trajectory of the different vehicle) as determined by sensor data indicating that the one or more occlusions are located between the different vehicle and the one or more objects in a location/position such that the one or more occlusions at least partially block the view of the one or more objects from the different vehicle's perspective.

In an illustrative example, the autonomous vehicle can determine that one or more occlusions are at least partially blocking a view of the one or more objects from a perspective of the different vehicle based on the positions of the different vehicle, the one or more occlusions, and the one or more objects; the size/shape of the one or more occlusions and/or the one or more objects; the angles between the different vehicle, the one or more occlusions, and the one or more objects; the distances between the different vehicle, the one or more occlusions, and the one or more objects; the lighting conditions in the scene; motion (e.g., speed, trajectory, etc.) of the different vehicle, the one or more occlusions, and/or the one or more objects; a difference in elevation between the different vehicle, the one or more occlusions, and the one or more objects; a determination that the different vehicle has a driver or is an autonomous vehicle navigating based on sensor data (e.g., which may affect the FOV and/or viewing capabilities of the different vehicle); etc.

In some cases, the autonomous vehicle can implement an algorithm that estimates a time-to-collision between the different vehicle and the one or more objects projected a certain time into the future and/or determines a probability of a time-to-collision between the different vehicle and the one or more objects projected a certain time into the future, and change (e.g., based on the estimated time-to-collision and/or the probability of the time-to-collision) a type of alert generated by the autonomous vehicle, a presentation or output of the alert, an intensity of the alert, a frequency of a presentation/output of alerts, a level of the alert, a color of the alert, a volume and/or sound of the alert, a visual characteristic of the alert, a pattern of the alert, information associated with the alert, etc. In some examples, the algorithm can include an artificial intelligence or machine learning algorithm. For example, in some cases, the algorithm can include a deep neural network model.

In some cases, the autonomous vehicle can increase an intensity of the alert, a presentation/output frequency of the alert, a color of the alert, a size of the alert, a saliency/prominence of the alert (e.g., as perceived by one or more sensors and/or one or more human senses), etc., in response to detecting an increase in a probability and/or confidence of the collision and/or the time-to-collision, an increase in an estimated intensity/severity (e.g., based on an estimated degree of harm to life and/or property) of the collision, a decrease in the time-to-collision, a decrease in an available reaction time until the collision, a decrease in space and/or options available to avoid and/or mitigate the collision, etc.

In some examples, determining the one or more estimated FOVs can include determining a distance between the different vehicle and the one or more objects and an angle between the different vehicle and the one or more objects, and determining the one or more estimated FOVs further based on the distance between the different vehicle and the one or more objects and the angle between the different vehicle and the one or more objects.

In some cases, the alert can include an audio alert, a video alert, an image, text data, a light emitted by a light-emitting device, and/or a pattern of light emitted by the light-emitting device.

In some aspects, the process 600 can include changing one or more characteristics of the alert in response to detecting a change in a distance between the different vehicle and the one or more objects, a speed of the different vehicle and/or the one or more objects, a change in an estimated time of impact between the different vehicle and the one or more objects, a change in a probability of the risk of the collision, and/or a change in an estimated severity of the collision. In some examples, changing the one or more characteristics of the alert can include changing a color of the alert, changing a size of the alert, changing an output frequency of the alert, changing a volume of the alert, changing information associated with the alert, and/or changing a pattern of the alert.

Figure 7:
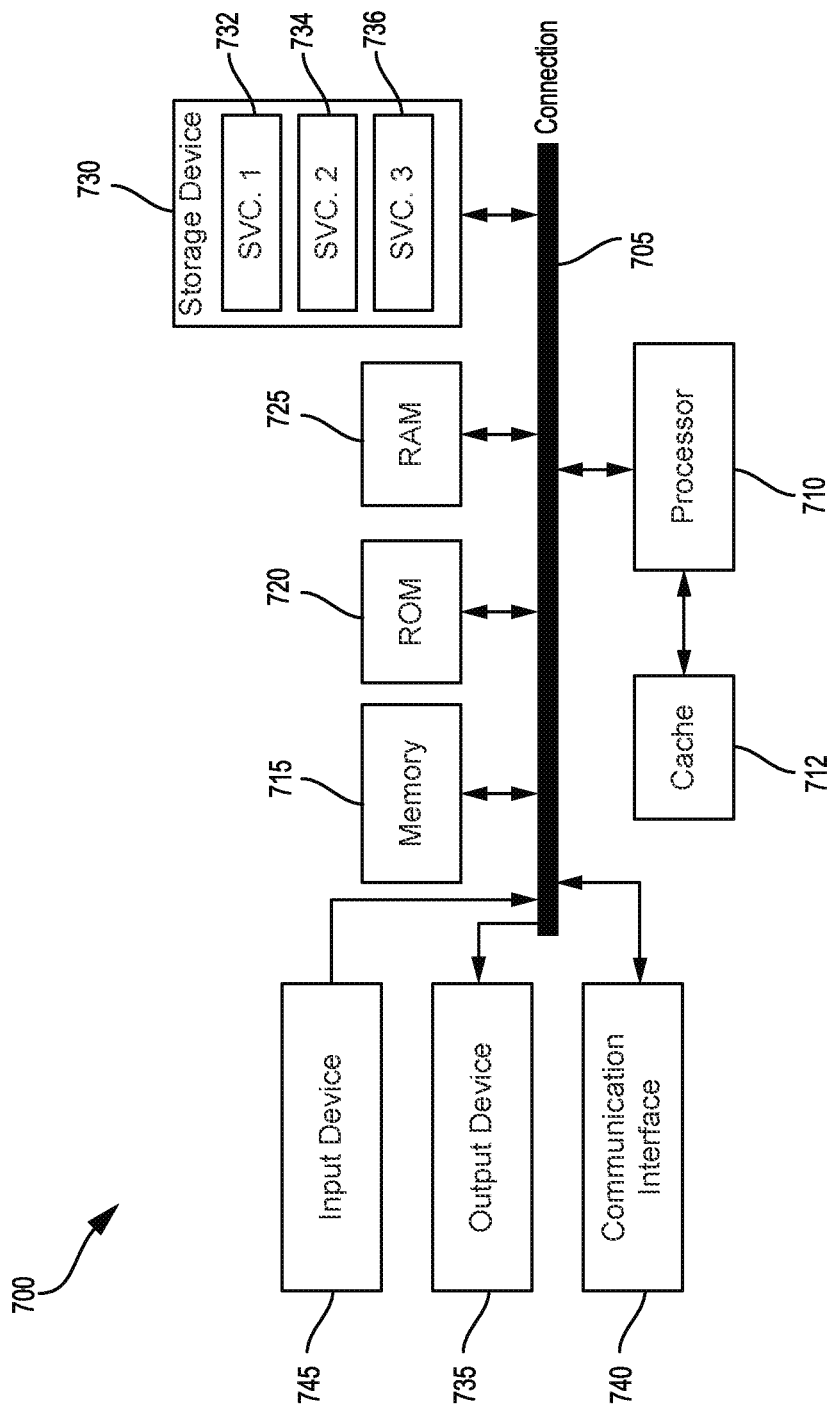
FIG. 7 is a diagram illustrating an example system architecture for implementing certain aspects described herein.

FIG. 7 illustrates an example processor-based system with which some aspects of the subject technology can be implemented. For example, processor-based system 700 can be any computing device making up local computing device 110, client computing device 170, a passenger device executing the ridesharing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 can include an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, causes the system to perform a function. In some examples, a hardware service that performs a particular function can include the software component stored in a computer-readable medium in connection with the necessary hardware components, such as processor 710, connection 705, output device 735, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: a memory; and one or more processors coupled to the memory, the one or more processors being configured to: determine, based on sensor data captured by an autonomous vehicle, a first position of a different vehicle and a second position of one or more objects; determine, based on the first position of the different vehicle and the second position of the one or more objects, a risk of a collision between the different vehicle and the one or more objects; and based on a determination that the risk of the collision exceeds a threshold, output an alert representing a warning of the collision between the different vehicle and the one or more objects, the alert being directed to at least one of the different vehicle and the one or more objects.

Aspect 2. The system of Aspect 1, wherein outputting the alert comprises sending a vehicle-to-vehicle (V2V) wireless communication signal to at least one of a computer system of the different vehicle and a software planning stack implemented by the computer system of the different vehicle, wherein the V2V wireless communication signal comprises the alert.

Aspect 3. The system of Aspect 1 or 2, wherein the alert comprises at least one of a description of the risk of the collision, an indication of one or more actions that the different vehicle can perform to avoid the collision, and at least a portion of the sensor data.

Aspect 4. The system of any of Aspects 1 to 3, wherein the one or more processors are configured to: determine, based on the sensor data, a first trajectory of the different vehicle and a second trajectory of the one or more objects; and determine the risk of the collision further based on the first trajectory and the second trajectory.

Aspect 5. The system of Aspect 4, wherein determining the risk of the collision further comprises: determining, based on the first trajectory of the different vehicle and the second trajectory of the one or more objects, that the different vehicle and the one or more objects are in a trajectory to intersect within at least a threshold period of time.

Aspect 6. The system of any of Aspects 1 to 5, wherein the one or more processors are configured to: determine, based on the sensor data, a speed and direction of the different vehicle, a speed and direction of the one or more objects, and a distance between the different vehicle and the one or more objects at one or more periods of time; and determine the risk of the collision further based on the speed and direction of the different vehicle, the speed and direction of the one or more objects, and the distance between the different vehicle and the one or more objects at the one or more periods of time.

Aspect 7. The system of any of Aspects 1 to 6, wherein the one or more processors are configured to: based on the first position of the different vehicle, the second position of the one or more objects, and a third position of the autonomous vehicle, determine that at least one of a first view from the first position of the different vehicle to the second position of the one or more objects is obstructed by the autonomous vehicle and a second view from the second position of the one or more objects to the first position of the different vehicle is obstructed by the autonomous vehicle; and output the alert in response to determining that at least one of the first view and the second view is obstructed by the autonomous vehicle.

Aspect 8. The system of any of Aspects 1 to 7, wherein the one or more processors are configured to: determine one or more estimated field-of-views (FOVs) based on the first position of the different vehicle and the second position of the one or more objects, the one or more estimated FOVs comprising at least one of a first FOV from the first position of the different vehicle and a second FOV from the second position of the one or more objects, wherein the first FOV corresponds to an estimated view of at least one of a driver of the different vehicle and one or more sensors on the different vehicle; determine, based on the one or more estimated FOVs and a third position of the autonomous vehicle, that at least one of a first view from the first position of the different vehicle to the second position of the one or more objects is obstructed by the autonomous vehicle and a second view from the second position of the one or more objects to the first position of the different vehicle is obstructed by the autonomous vehicle; and output the alert in response to determining that at least one of the first view and the second view is obstructed by the autonomous vehicle.

Aspect 9. The system of Aspect 8, wherein determining the one or more estimated FOVs comprises: determining a distance between the different vehicle and the one or more objects and an angle between the different vehicle and the one or more objects; and determining the one or more estimated FOVs further based on the distance between the different vehicle and the one or more objects and the angle between the different vehicle and the one or more objects.

Aspect 10. The system of any of Aspects 1 to 9, wherein the alert comprises at least one of an audio alert, a video alert, an image, text data, a light emitted by a light-emitting device, and a pattern of light emitted by the light-emitting device, and wherein the one or more objects comprise at least one of a person, an animal, an object, a vehicle, and a road obstacle.

Aspect 11. A method comprising: determining, based on sensor data captured by an autonomous vehicle, a first position of a different vehicle and a second position of one or more objects; determining, based on the first position of the different vehicle and the second position of the one or more objects, a risk of a collision between the different vehicle and the one or more objects; and based on a determination that the risk of the collision exceeds a threshold, outputting an alert representing a warning of the collision between the different vehicle and the one or more objects, the alert being directed to at least one of the different vehicle and the one or more objects.

Aspect 12. The method of Aspect 11, wherein outputting the alert comprises sending a vehicle-to-vehicle (V2V) wireless communication signal to at least one of a computer system of the different vehicle and a software planning stack implemented by the computer system of the different vehicle, wherein the V2V wireless communication signal comprises the alert.

Aspect 13 The method of Aspect 11 or 12, wherein the alert comprises at least one of a description of the risk of the collision, an indication of one or more actions that the different vehicle can perform to avoid the collision, and at least a portion of the sensor data.

Aspect 14. The method of any of Aspects 11 to 13, further comprising: determining, based on the sensor data, a first trajectory of the different vehicle and a second trajectory of the one or more objects; and determining the risk of the collision further based on the first trajectory and the second trajectory.

Aspect 15. The method of Aspect 14, wherein determining the risk of the collision further comprises: determining, based on the first trajectory of the different vehicle and the second trajectory of the one or more objects, that the different vehicle and the one or more objects are in a trajectory to intersect within at least a threshold period of time; and determining the risk of the collision further based on the determining that the different vehicle and the one or more objects are in the trajectory to intersect within at least the threshold period of time.

Aspect 16. The method of any of Aspects 11 to 15, further comprising: determining, based on the sensor data, a speed and direction of the different vehicle, a speed and direction of the one or more objects, and a distance between the different vehicle and the one or more objects at one or more periods of time; and determining the risk of the collision further based on the speed and direction of the different vehicle, the speed and direction of the one or more objects, and the distance between the different vehicle and the one or more objects at the one or more periods of time.

Aspect 17. The method of any of Aspects 11 to 16, further comprising: based on the first position of the different vehicle, the second position of the one or more objects, and a third position of the autonomous vehicle, determining that at least one of a first view from the first position of the different vehicle to the second position of the one or more objects is obstructed by the autonomous vehicle and a second view from the second position of the one or more objects to the first position of the different vehicle is obstructed by the autonomous vehicle; and outputting the alert in response to determining that at least one of the first view and the second view is obstructed by the autonomous vehicle.

Aspect 18. The method of any of Aspects 11 to 17, further comprising: determining one or more estimated field-of-views (FOVs) based on the first position of the different vehicle and the second position of the one or more objects, the one or more estimated FOVs comprising at least one of a first FOV from the first position of the different vehicle and a second FOV from the second position of the one or more objects, wherein the first FOV corresponds to an estimated view of at least one of a driver of the different vehicle and one or more sensors on the different vehicle; determining, based on the one or more estimated FOVs and a third position of the autonomous vehicle, that at least one of a first view from the first position of the different vehicle to the second position of the one or more objects is obstructed by the autonomous vehicle and a second view from the second position of the one or more objects to the first position of the different vehicle is obstructed by the autonomous vehicle; and outputting the alert in response to determining that at least one of the first view and the second view is obstructed by the autonomous vehicle.

Aspect 19. The method of Aspect 18, wherein determining the one or more estimated FOVs comprises: determining a distance between the different vehicle and the one or more objects and an angle between the different vehicle and the one or more objects; and determining the one or more estimated FOVs further based on the distance between the different vehicle and the one or more objects and the angle between the different vehicle and the one or more objects.

Aspect 20. The method of any of Aspects 11 to 9, wherein the alert comprises at least one of an audio alert, a video alert, an image, text data, a light emitted by a light-emitting device, and a pattern of light emitted by the light-emitting device.

Aspect 21. The method of any of Aspects 11 to 20, further comprising changing one or more characteristics of the alert in response to detecting a change in at least one of a distance between the different vehicle and the one or more objects, a speed of at least one of the different vehicle and the one or more objects, a change in an estimated time of impact between the different vehicle and the one or more objects, a change in a probability of the risk of the collision, and a change in an estimated severity of the collision.

Aspect 22. The method of Aspect 21, wherein changing the one or more characteristics of the alert comprises at least one of changing a color of the alert, changing a size of the alert, changing an output frequency of the alert, changing a volume of the alert, changing information associated with the alert, and changing a pattern of the alert.

Aspect 23. The method of any of Aspects 11 to 22, wherein the one or more objects comprise at least one of a person, an animal, an object, a vehicle, and a road obstacle.

Aspect 24. An autonomous vehicle comprising: a memory and one or more processors coupled to the memory, the one or more processors being configured to perform a method according to any of Aspects 11 to 22.

Aspect 25. A non-transitory computer-readable medium having stored thereon instructions which, when executed by one or more processors, cause the one or more processors to perform a method according to any of Aspects 11 to 22.

Aspect 26. A system comprising means for performing a method according to any of Aspects 11 to 22.

Aspect 27. A computer-program product comprising instructions stored thereon which, when executed by one or more processors, cause the one or more processors to perform a method according to any of Aspects 11 to 22.

What is claimed is:

1. A system comprising:
a memory; and
one or more processors coupled to the memory, the one or more processors being configured to:
determine, based on sensor data captured by an autonomous vehicle, a first position of a different vehicle and a second position of one or more objects;
determine, based on the first position of the different vehicle and the second position of the one or more objects, a risk of a collision between the different vehicle and the one or more objects;
based on the first position of the different vehicle, the second position of the one or more objects, and a third position of the autonomous vehicle, determine that at least one of a first view from the first position of the different vehicle to the second position of the one or more objects is obstructed by the autonomous vehicle and a second view from the second position of the one or more objects to the first position of the different vehicle is obstructed by the autonomous vehicle; and
based on a determination that the risk of the collision exceeds a threshold and in response to determining that at least one of the first view and the second view is obstructed by the autonomous vehicle, output an alert representing a warning of the collision between the different vehicle and the one or more objects, the alert being directed to at least one of the different vehicle and the one or more objects.

2. The system of claim 1, wherein outputting the alert comprises sending a vehicle-to-vehicle (V2V) wireless communication signal to at least one of a computer system of the different vehicle and a software planning stack implemented by the computer system of the different vehicle, wherein the V2V wireless communication signal comprises the alert.

3. The system of claim 2, wherein the alert comprises at least one of a description of the risk of the collision, an indication of one or more actions that the different vehicle can perform to avoid the collision, and at least a portion of the sensor data.

4. The system of claim 1, wherein the one or more processors are configured to:
determine, based on the sensor data, a first trajectory of the different vehicle and a second trajectory of the one or more objects; and
determine the risk of the collision further based on the first trajectory and the second trajectory.

5. The system of claim 4, wherein determining the risk of the collision further comprises:
determining, based on the first trajectory of the different vehicle and the second trajectory of the one or more objects, that the different vehicle and the one or more objects are in a trajectory to intersect within at least a threshold period of time.

6. The system of claim 1, wherein the one or more processors are configured to:
determine, based on the sensor data, a speed and direction of the different vehicle, a speed and direction of the one or more objects, and a distance between the different vehicle and the one or more objects at one or more periods of time; and
determine the risk of the collision further based on the speed and direction of the different vehicle, the speed and direction of the one or more objects, and the distance between the different vehicle and the one or more objects at the one or more periods of time.

7. The system of claim 1, wherein the alert comprises at least one of an audio alert, a video alert, an image, text data, a light emitted by a light-emitting device, and a pattern of light emitted by the light-emitting device, and wherein the one or more objects comprise at least one of a person, an animal, an object, a vehicle, and a road obstacle.

8. A method comprising:
   determining, based on sensor data captured by an autonomous vehicle, a first position of a different vehicle and a second position of one or more objects;
   determining, based on the first position of the different vehicle and the second position of the one or more objects, a risk of a collision between the different vehicle and the one or more objects;
   determining one or more estimated field-of-views (FOVs) based on the first position of the different vehicle and the second position of the one or more objects, the one or more estimated FOVs comprising at least one of a first FOV from the first position of the different vehicle and a second FOV from the second position of the one or more objects, wherein the first FOV corresponds to an estimated view of at least one of a driver of the different vehicle and one or more sensors on the different vehicle;
   determining, based on the one or more estimated FOVs and a third position of the autonomous vehicle, that at least one of a first view from the first position of the different vehicle to the second position of the one or more objects is obstructed by the autonomous vehicle and a second view from the second position of the one or more objects to the first position of the different vehicle is obstructed by the autonomous vehicle; and
   based on a determination that the risk of the collision exceeds a threshold and in response to determining that at least one of the first view and the second view is obstructed by the autonomous vehicle, outputting an alert representing a warning of the collision between the different vehicle and the one or more objects, the alert being directed to at least one of the different vehicle and the one or more objects.

9. The method of claim 8, wherein outputting the alert comprises sending a vehicle-to-vehicle (V2V) wireless communication signal to at least one of a computer system of the different vehicle and a software planning stack implemented by the computer system of the different vehicle, wherein the V2V wireless communication signal comprises the alert.

10. The method of claim 9, wherein the alert comprises at least one of a description of the risk of the collision, an indication of one or more actions that the different vehicle can perform to avoid the collision, and at least a portion of the sensor data.

11. The method of claim 8, further comprising:
   determining, based on the sensor data, a first trajectory of the different vehicle and a second trajectory of the one or more objects;
   determining the risk of the collision further based on the first trajectory and the second trajectory;
   determining, based on the first trajectory of the different vehicle and the second trajectory of the one or more objects, that the different vehicle and the one or more objects are in a trajectory to intersect within at least a threshold period of time; and determining the risk of the collision further based on the determining that the different vehicle and the one or more objects are in the trajectory to intersect within at least the threshold period of time.

12. The method of claim 8, further comprising:
   determining, based on the sensor data, a speed and direction of the different vehicle, a speed and direction of the one or more objects, and a distance between the different vehicle and the one or more objects at one or more periods of time; and
   determining the risk of the collision further based on the speed and direction of the different vehicle, the speed and direction of the one or more objects, and the distance between the different vehicle and the one or more objects at the one or more periods of time.

13. The method of claim 8, wherein determining the one or more estimated FOVs comprises:
   determining a distance between the different vehicle and the one or more objects and an angle between the different vehicle and the one or more objects; and
   determining the one or more estimated FOVs further based on the distance between the different vehicle and the one or more objects and the angle between the different vehicle and the one or more objects.

14. The method of claim 8, wherein the alert comprises at least one of an audio alert, a video alert, an image, text data, a light emitted by a light-emitting device, and a pattern of light emitted by the light-emitting device, and wherein the one or more objects comprise at least one of a person, an animal, an object, a vehicle, and a road obstacle.

15. A non-transitory computer-readable medium having stored thereon instructions which, when executed by one or more processors, cause the one or more processors to:
   determine, based on sensor data captured by an autonomous vehicle, a first position of a different vehicle and a second position of one or more objects;
   determine, based on the first position of the different vehicle and the second position of the one or more objects, a risk of a collision between the different vehicle and the one or more objects;
   based on the first position of the different vehicle, the second position of the one or more objects, and a third position of the autonomous vehicle, determine that at least one of a first view from the first position of the different vehicle to the second position of the one or more objects is obstructed by the autonomous vehicle and a second view from the second position of the one or more objects to the first position of the different vehicle is obstructed by the autonomous vehicle; and
   based on a determination that the risk of the collision exceeds a threshold and in response to determining that at least one of the first view and the second view is obstructed by the autonomous vehicle, output an alert representing a warning of the collision between the different vehicle and the one or more objects, the alert being directed to at least one of the different vehicle and the one or more objects.

* * * * *